United States Patent [19]
Ennis

[11] 3,738,620
[45] June 12, 1973

[54] AQUARIUM AERATOR

[76] Inventor: Bobbey G. Ennis, 40975 Chiltern Drive, Fremont, Calif. 94538

[22] Filed: Aug. 4, 1971

[21] Appl. No.: 168,808

[52] U.S. Cl............... 261/6, 261/64 R, 261/71, 261/121 R, 261/DIG. 75, 210/169
[51] Int. Cl............................................. B01f 3/04
[58] Field of Search................ 210/169; 261/64 R, 261/71, 121 R, DIG. 75, 6

[56] References Cited
UNITED STATES PATENTS

| 2,050,771 | 8/1936 | Wait | 261/DIG. 75 |
| 2,515,538 | 7/1950 | Wall | 210/169 |
| 3,294,239 | 12/1966 | Dayes | 210/169 |
| 3,302,789 | 2/1967 | Holt | 210/169 X |
| 3,477,580 | 11/1969 | Willinger | 210/169 |
| 3,552,568 | 1/1971 | Wade | 210/169 |
| 3,616,919 | 11/1971 | Feddern | 210/169 |
| 3,640,516 | 2/1972 | Willinger | 210/169 X |

FOREIGN PATENTS OR APPLICATIONS

| 678,935 | 9/1952 | Great Britain | 261/121 R |

Primary Examiner—Tim R. Miles
Assistant Examiner—Richard L. Chiesa
Attorney—James R. Cypher

[57] ABSTRACT

An aerator for an aquarium which includes a venturi tube in the recirculating system at the water return side, air and water reservoirs located adjacent the venturi tube, a small passage carrying controlled amounts of air in the upper portion of the passage from the air reservoir and controlled amounts of water in the lower portion of the passage from the water reservoir, the passage having a discharge port opening to the restricted section of the venturi where the air enters the water forming tiny bubbles, and a manually adjustable control for adjusting the air/water ratio flow through the passage. The passage being dimensioned such that the water meniscus in the passage covers a substantial portion of the passage.

6 Claims, 9 Drawing Figures

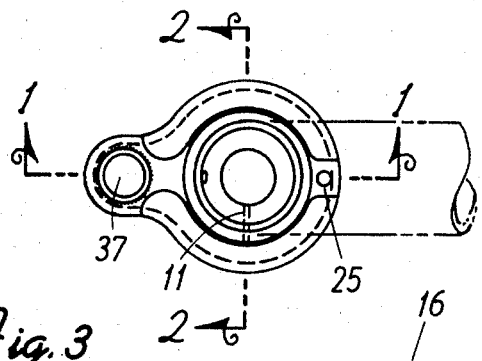
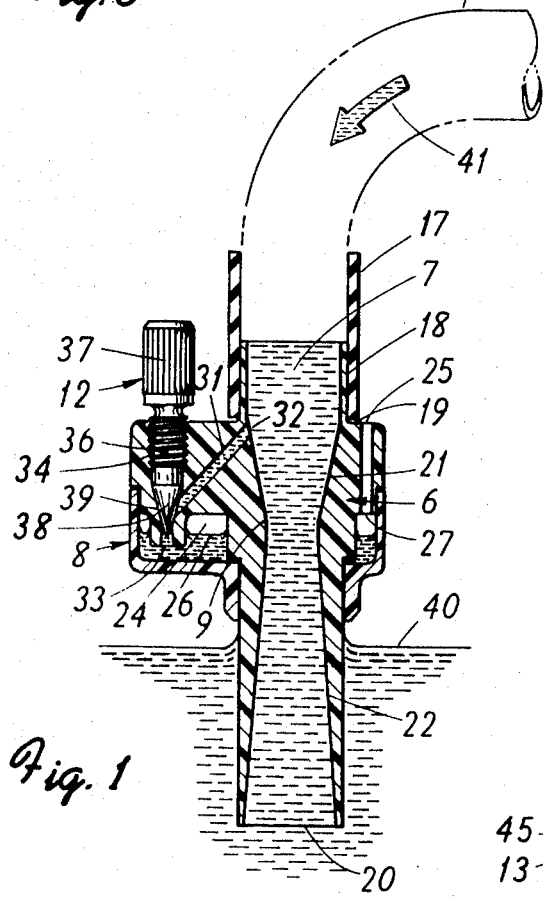
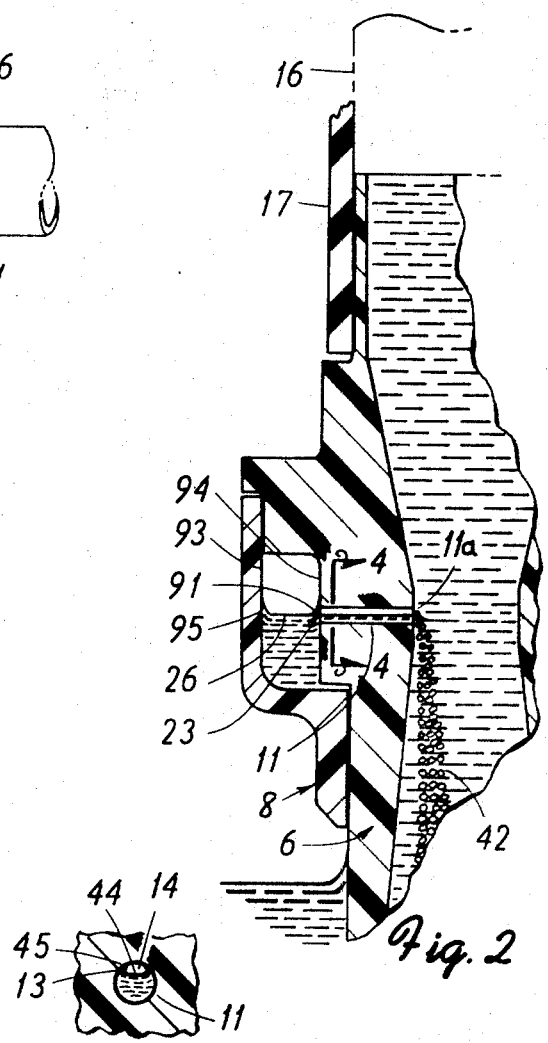

PATENTED JUN 12 1973 3,738,620

INVENTOR
Bobby G. Ennis
BY James R. Cypher

AQUARIUM AERATOR

BACKGROUND OF THE INVENTION

In order to provide sufficient quantities of oxygen in an aquarium to sustain fish it is necessary to add oxygen to the water, either by replacing the water or injecting air into the water by some apparatus. Pumps may be used to circulate the water through filters outside the aquarium and air may be added to this circulating water by merely permitting the water to drop from a predetermined height in the same manner as a waterfall. Such systems obviously generate a fair amount of audible sound.

In other systems, air is introduced by connecting an air hose to a venturi tube which is connected to the discharge line of the recirculating system. This system introduces great quantities of air in the form of air bubbles which are large and uncontrolled as to size. These bubbles rise to the surface of the aquarium and burst in a continuous series of popping noises. Although the sound of the bursting bubbles is not loud, it is irritating to some persons who must work in quiet reception rooms and other places where aquariums are located.

SUMMARY OF THE INVENTION

The gist of this invention is the discovery that the size of air bubbles can be controlled and tiny bubbles can be formed by introducing water and air through a small passage so that the air enters the water through a meniscus rather than directly at a water/air interface where surface tension is much higher.

An object of the present invention is to provide an attachment which can be directly connected to standard circulating pumps for aquariums wherein the tiny bubbles breaking at the surface make little more sound than that created by a newly opened bottle of a carbonated beverage.

A further object of the present invention is to provide a device to aerate aquariums which is inexpensive to manufacture, can be connected to existing aquarium equipment, has only one moving part and is nearly silent in operation.

A further object is to provide an aerator which permits the bubble size to be regulated.

A further object is to provide an aerator which requires no replacement materials, is nearly maintenance free and will last the life of the aquarium.

BRIEF DESCRIPTION OF THE DRAWINGS

FIG. 1 is a cross sectional view of the device constructed in accordance with the present invention taken substantially along line 1—1 of FIG. 3. The device is shown mounted in an aquarium with the return tube of a water recirculating system shown in phantom line.

FIG. 2 is an enlarged cross sectional view of a portion of the device shown in FIG. 1 and taken substantially along line 2—2 of FIG. 3.

FIG. 3 is a top plan view of the device of FIGS. 1 and 2.

FIG. 4 is an enlarged section of a portion of the device in FIG. 2 taken along line 4—4.

BRIEF DESCRIPTION OF THE PREFERRED EMBODIMENTS OF THE INVENTION

Figure 6:
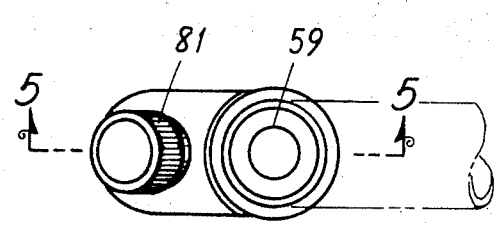
FIG. 6 is a top plan view of the device of FIG. 5.

The aerator of the present invention consists briefly of a venturi tube 6 adapted for connection to a source of water 7; an air and water reservoir 8 mounted adjacent the throat 9 of the venturi above the reservoir; a passageway 11 (sometimes referred to as a first passageway) connecting the water and air reservoir with the venturi throat and having a discharge port opening 11a substantially smaller than the venturi throat opening; and means 12 for adjusting the level of water in the reservoir so that water and air will flow through the passageway such that the meniscus 13 formed on the wall of the passage covers a substantial portion of the opening in the passageway and intrudes upon the portion 14 of the passageway which carries the air.

The device is preferably made of plastic for durability but can be made of metal or other materials. It is connected to the outlet tube 16 of a water recirculating system by an elastic annular sleeve 17. The device preferably has a neck portion 18 dimensioned to fit standard flexible tubing and a shoulder 19 to prevent further insertion of the tubing.

The design of the venturi is standard and the purpose is to create a low pressure zone in the throat so that air and water will be drawn through the passageway 11. The design of the venturi has not been found to be critical and the following dimensions are given only by way of example. The converging walls 21 are at an approximate angle of 22° below the cylindrical neck section 18. The divergent walls 22 are at an angle of about 7½° to 8°.

The passageway 11 connecting the throat and the reservoir is not critical in size although it necessarily must be fairly small so that the meniscus can fill a substantial portion of the area of the passageway through which air is moving. An opening of about 0.020 to 0.030 inch has been found to work satisfactorily.

The water and air reservoir may be constructed in various ways. The essential characteristic is that the water level of the reservoir must be maintained at least to the level of the passageway 11 so that controlled amounts of water and air may pass therethrough. Referring to FIG. 1, the water and air reservoir consists of member 8 forming a chamber 24 which is located adjacent the venturi forming a water tight fit therewith. The water level is indicated by the line 26. Air flows to the reservoir through passage 25 and enters at a conveniently placed opening 27 in the top portion of the reservoir. Normally the reservoir will be placed above the level in the aquarium as shown in FIG. 1, but in an alternate form, the entire apparatus including the reservoir can be submerged below the level of the water by inserting an elongated tube into passage 25 to extend above the water surface in the manner of a snorkel.

In each form of the invention, there must be a method of filling the reservoir with a supply of water since the water is continually drawn through the passage 11. In FIG. 1, a small passage 31 (sometimes referred to as a second passageway) is formed or drilled in the apparatus extending from an opening 32 at the upstream end of the venturi tube to an opening into the reservoir as at point 33. Preferably the water is discharged below the normal water level of the reservoir. There are other means for filling the reservoir and they will be described below.

The level of water in the reservoir may be controlled by either controlling the intake of water or air. In FIGS. 1, 2 and 3, the control means regulates the supply of water. THe device is constructed with a threaded opening 34 in which is inserted a threaded member 36 having a knurled manually engageable knob 37. A cone shaped needle valve 38 seats on a valve seat 39 located in the passageway 31 so as to regulate the flow of intake water to the reservoir by merely turning the knob 37.

To operate the device in FIGS. 1 and 2, the venturi tube discharge end 20 is inserted below the surface 40 of the water in the aquarium and water is caused to circulate through the tube 16 in the direction shown by arrow 41. Needle valve 38 is opened permitting water to flow through passage 31 and to fill reservoir 8 to the approximate level of the opening to passage 11. Air bubbles 42 are large at first but as the water level rises at the opening 23, the bubbles will begin to get smaller. The valve should not be opened so wide as to flood the opening.

The reason for the usually great number of uniformly tiny bubbles is not fully understood but it has been observed by tests that the desired size and quantity of bubbles appears when the opening is so filled with water that the meniscus 13 in the opening 23 covers a substantial portion of the remaining air opening 14. Note in FIG. 4 that the level of the water in opening 23 is at point 44 and the top of the meniscus is well above at lever 45. The forming of a meniscus is a well known phenomenon in which the adhesive force between the water and walls of the device is greater than the cohesive force of the water. Another factor is that it has been found that the surface tension at the meniscus is less than the surface tension at the normal water level surface 44. Thus it is believed that the air rushing through the opening breaks the water surface tension at the surface of the meniscus, and there is an infusion of air into the water at this point. It is also believed that there is friction between the interfaces of the water and air, and the rushing water causes air to be drawn along the water surface into the passageway 11. When the air reaches the end of the passageway at discharge opening 11a, it meets a wall of fast moving water in the venturi tube where it is drawn into the water; primarily through the meniscus where the surface tension of the water is relatively less. If the air is regulated so that the air opening 14 is relatively small, the device will form hundreds of tiny bubbles which break at the water surface 40 relatively noiselessly.

Another form of the invention is shown in FIGS. 5-7, and 9. The identical principle is used to form the bubbles but instead of controlling the level of the reservoir by adjusting the amount of water inflow, the amount of air is subject to adjustable control. The device consists of a venturi tube 56 having upstream converging walls 57, and downstream diverging walls 58 separated by a throat area 59. The angles of the walls are the same as previously described for the device shown in FIGS. 1 and 2. The venturi has an upper cylindrical wall 61 formed with a shoulder 62 for receiving a flexible sleeve 63 which is connected to an outlet tube 64 in which water flows in the direction shown by arrow 66. A passageway 67 connects the throat of the venturi tube with the reservoir 68 and is the same size as the passageway described in FIG. 1.

Instead of the reservoir being filled with water from above, the form of the invention shown in FIGS. 5 - 7 fills the reservoir with water from below. In specific, the reservoir has an opening 69 at its lower end which opens to the main body of water 71 which fills the aquarium. The top portion of the reservoir is enclosed by sidewalls 72 and top wall 73. A passageway 74 is formed in the device with an inlet 75 opening to the atmosphere and a discharge opening 76 opening to the air chamber 77 in the reservoir. A threaded needle valve 78 opens and closes the passageway 74 by seating on a valve seat 79 formed in the device. The valve is closed by rotating knurled knob 81. In order to prevent clogging of the small passageway 67, it is desirable to place a filter 83 in the inlet end of the reservoir. Because a relatively great amount of suction is formed in reservoir 68, it is necessary to either restrict opening 69 or place a relatively dense filter material in the opening.

Figure 5:
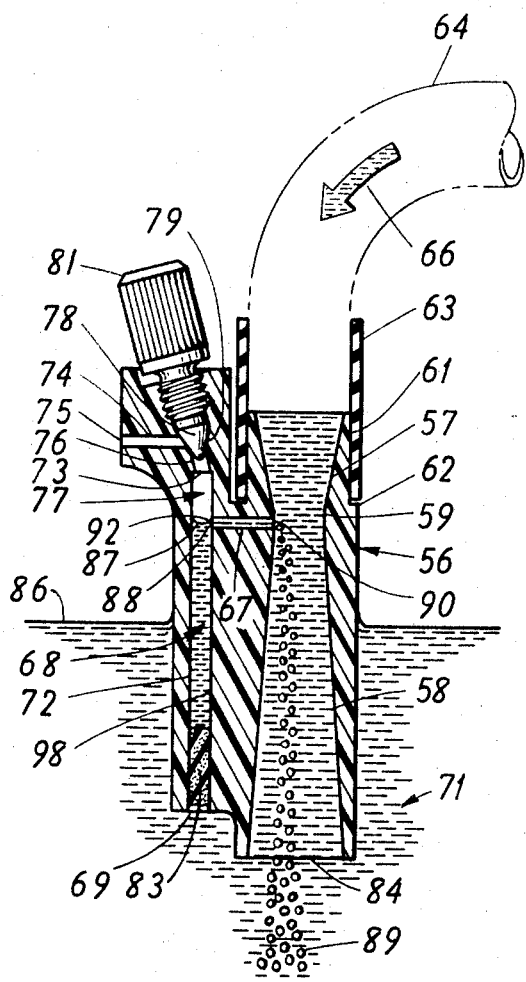
FIG. 5 is a cross sectional view of another form of the invention taken substantially along line 5—5 of FIG. 6. The device is mounted in an aquarium and the return tube of a water recirculating system is shown in phantom line.
Figure 7:
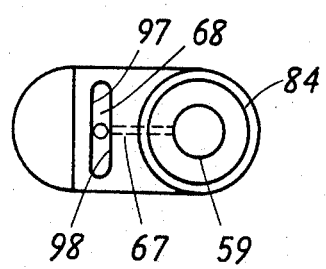
FIG. 7 is a bottom view of the device of FIG. 5.
Figure 8:
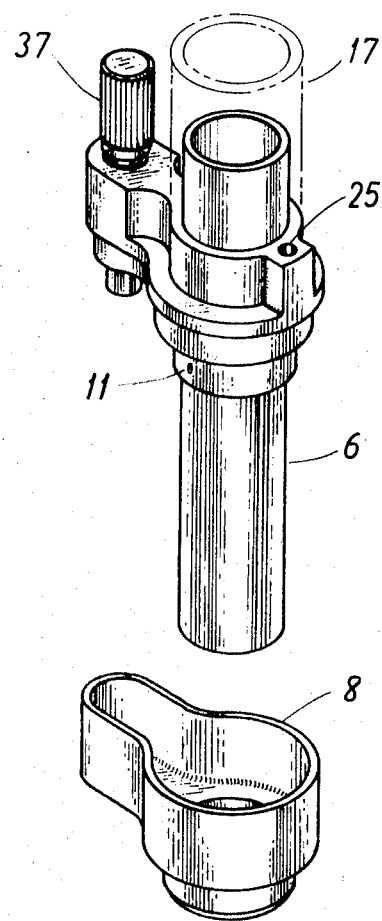
FIG. 8 is a perspective exploded view of the device shown in FIGS. 1-3.
Figure 9:
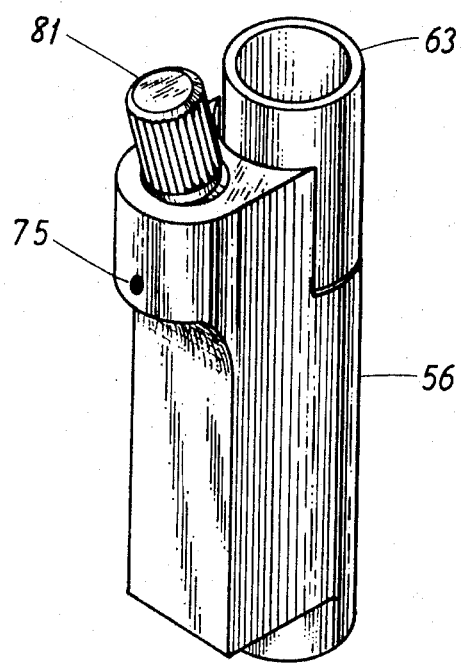
FIG. 9 is a perspective view of the device shown in FIGS. 5-7.

The operation of the device shown in FIGS. 5-7 is similar to the operation of the device of FIGS. 1 and 2. The device is placed in the aquarium with the outlet 84 of the venturi tube submerged below the water surface 86 of the aquarium. The filtered water enters through tube 64 and causes the pressure to drop at the throat portion of the venturi, thus creating a suction through passageway 67. If the needle valve is closed, water will rise in the reservoir; being taken from the aquarium through the inlet 69. The needle valve must be adjusted to leave just sufficient air to enter passage 74 so that the water level 87 will rise to the level of opening 88 so that the meniscus fills a significant portion of the air space left in the opening as shown in FIG. 4. The air bubbles 89 are formed in the same manner as previously described and the bubbles enter the venturi at discharge opening 90 of the passageway 67. The bubbles are discharged through opening 84 in the venturi tube and rise to surface 86.

It has been found that the tiny bubbles are more easily formed when a surfactant is added to the aquarium water The improved condition is believed due to the fact that the surfactant lowers the surface tension of the water and the air enters the water in the passageways 11 and 67 more easily because of the decreased surface tension. Another possible explanation is the fact that the surfactant makes the water a better "wetting agent" which causes a greater meniscus to be formed in the first passageway; again permitting the air to enter the water more easily because of the decreased surface tension at the meniscus.

Several surfactants can be used; all of which must be non-toxic when used in aquariums. One example is "TWEEN 80" a trademark, which is polyoxyethylene sorbitan monooleate. Between 1 and 2 drops of 100 percent concentrate per gallon of water works satisfactorily.

In both forms of the invention it has been found advantageous to locate the walls of the water and air reservoirs in close proximity to the venturi tube. Whether the meniscus 91 formed at the passageway 11 in FIG. 2 or the meniscus 92 formed at the passageway 67 in FIG. 5 plays a part in the forming of the bubbles is not known. The inside wall 93 of the reservoir is preferably about 0.06 – 0.100 inches from the outer venturi wall 94. Note meniscus 95 on the reservoir wall.

Referring to FIGS. 5 and 7, the inner wall 72 is located 0.06 – 0.100 inches from the outer wall 98 of the venturi causing a meniscus 92 to form. It is possible that air enters the water at the openings 23 and 88. In order to achieve such close wall proximity, especially at the passageway 11, the air valve mechanism and opening are separated as shown in FIG. 6. In both forms of the invention, greater quantities of small bubbles can be formed by forming additional passageways between the air and water reservoirs and the venturi tube.

I claim:

1. An aerator for an aquarium comprising:
   a. a venturi tube adapted for connection to a source of water;
   b. a water reservoir mounted adjacent the throat of said venturi;
   c. means for supplying water to said reservoir;
   d. an air reservoir;
   e. means supplying air to said reservoir;
   f. a first passageway connecting said air and water reservoirs with said venturi throat and having an opening substantially smaller than the throat opening; and
   g. means for adjusting the air and water ratio so that water and air will flow through said first passageway such that the meniscus formed on the wall of said first passage constitutes a substantial portion of the air opening in said first passageway.

2. An aerator as described in claim 1 comprising:
   a. means regulating the supply of water to said water reservoir.

3. An aerator as described in claim 1 comprising:
   a. means controlling the supply of air to said air reservoir.

4. An aerator as described in claim 2 comprising:
   a. a second passageway connecting said water reservoir and said source of water;
   b. said means for adjusting the level of water in said water reservoir being operatively connected to said second passageway; and
   c. said water reservoir being open to atmosphere.

5. An aerator as described in claim 3 comprising:
   a. said water reservoir being operatively connected to the water in said aquarium;
   b. a closed air reservoir mounted above said water reservoir and open to said water reservoir; and
   c. said means for adjusting the level of water in said water reservoir includes an air passage connecting said air reservoir and the atmosphere and a valve operatively connected to said air passage for restricting the flow of air.

6. An aerator as described in claim 1 comprising:
   a. air and water reservoirs being located below the water surface of said aquarium; and
   b. snorkel means connected to said air reservoir and extending above the water surface of the aquarium to the atmosphere.

* * * * *